April 21, 1964     M. F. HARTY, JR     3,129,606
HANDLE
Filed March 27, 1961

INVENTOR.
M. FILLMORE HARTY, JR.
BY Dale A. Winnie
ATTORNEY

United States Patent Office 3,129,606
Patented Apr. 21, 1964

3,129,606
HANDLE
Millard F. Harty, Jr., Mount Clemens, Mich., assignor to Michigan Brass Company, Grand Haven, Mich., a corporation of Michigan
Filed Mar. 27, 1961, Ser. No. 98,584
2 Claims. (Cl. 74—543)

This invention relates to handles in general and more particularly to a plumbing hardware handle for use on faucet assemblies and the like.

The faucet handles used on indoor plumbing fixtures are commonly of the wheel or lever type. Numerous variations of both of these species of handles have been placed before the public and, in general, such handles have been principally designed for greater ease of manufacture rather than as regards any improvement in functional or aesthetic character. The more expensive faucet handles are usually plated or include special inlays but are otherwise little different than the commonly known type of handle.

It is an object of this invention to provide a new and different handle and one which is principally functional.

The objects of this invention also include providing a handle member which is simple and modern in design, and inexpensive to manufacture.

The further objects of this invention include providing a handle member which is contoured and oriented to fit comfortably within a person's hand and wherein material is conserved without a sacrifice in strength or efficiency and ease of operation.

A more complete appreciation of this invention will be derived from a reading of the following specification and a study of the appended drawing.

Figure 1:
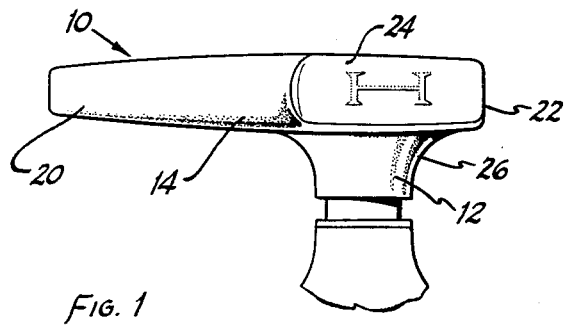
FIGURE 1 is a front plan view of the handle of this invention.
Figure 2:
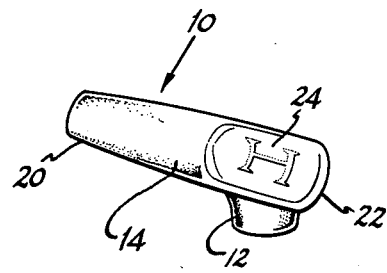
FIGURE 2 is a perspective view of the handle.

The handle which is hereinafter described is very attractive in appearance and the functional aspects thereof are not at first readily apparent. However, it will be shown by the description which follows that the particular shape used, the surface contours, and the canted or inclined disposition of the handle all serve a specific purpose aside from contributing to a pleasing product design.

The handle member 10 of FIGURES 1-6 is of the so-called beaver-tail type. It includes a neck portion 12 having the actual handle portion 14 provided thereon and protruding further on one side than the other thereof.

The neck portion 12 is formed to include a blind end passage 16 within its lower extremity which is receptive of a valve stem. A set screw 18 is provided through the back side of the neck portion to keep the handle engaged therewith.

The handle portion 14 is tapered towards the longer end 20 to a noticeable extent and is just slightly rounded-off at the other end 22 thereof. The general appearance is somewhat like a horizontally disposed and drawn-out tear-drop with blunt ends.

The tapered end 20 of the handle portion has a generally streamlined or oblong cross-section and, as disposed on the neck portion 12, presents only one convex surface thereof to the user. The appearance is one of depth and thickness but actually only a minimum of material is used.

The other end of the handle portion 14, and a part thereof over the neck portion 12, is formed to include a concave surface 24. It will be appreciated that this concavity is principally in the area of the neck portion 14 and that the neck portion is filleted outwardly as at 26. Accordingly, there is no sacrifice of material strength since there is ample material to provide the concavity at the neck portion and the minimal extension of the handle end 22 is strengthened by the neck fillet 26.

Figure 3:
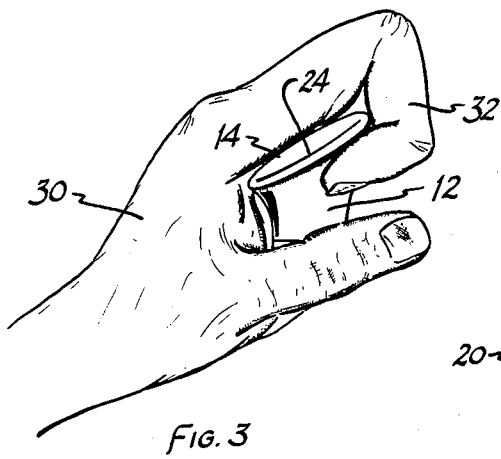
FIGURE 3 is an end plan view of the handle showing the orientation and hand receptive contours thereof.
Figure 4:
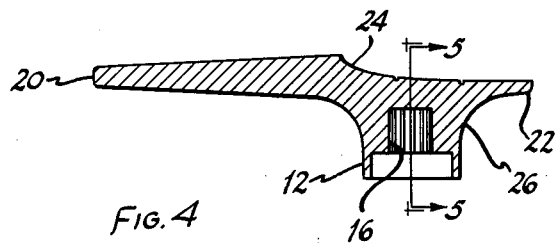
FIGURE 4 is a longitudinal cross-sectional view of the handle.
Figure 5:
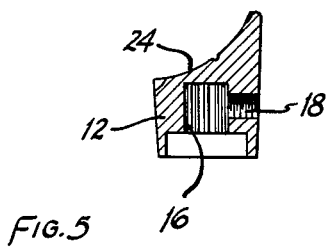
FIGURE 5 is a transverse cross-sectional view of the handle.

As best shown by FIGURE 3, a person's hand 30 is received comfortably about the handle 10 due to both its receptive contours and its orientation. The handle portion 14 is inclined or canted so that the fingers 32 of the hand 30 are received naturally therearound. The upper inclined edge of the handle fits perfectly within the crooked fingers of the hand and the pads of the fingers rest naturally on the surface thereof.

Figure 6:
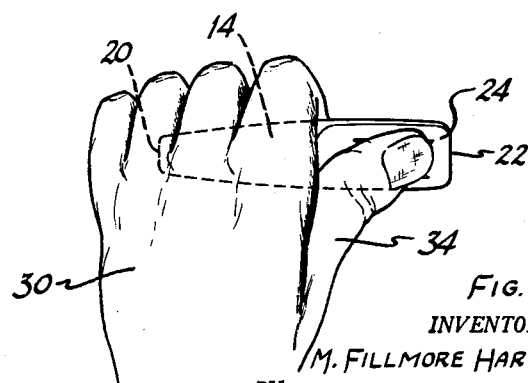
FIGURE 6 is an eye view of the handle looking directly down thereon and showing a hand engaged therewith.

It will also be appreciated that the taper of the handle end 22 is naturally suited to the tapered and narrowing grasp of the hand towards the little finger. This is best shown by FIGURE 6.

The thumb 34 of the hand 30 is received on the concave face 24 and in such position is directly over the pivot point of the handle. The concavity is perfectly receptive of the ball of the thumb and the grasp described is most natural. Further, it will be noted that the thumb is on an inclined surface, though concave, and that the natural tendency is to rotate the handle in the required manner.

Figure 7:
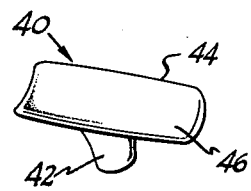
FIGURE 7 is a front perspective view of another form of the disclosed handle.

The handle member 40 shown by FIGURE 7 is similar to the handle 10 just described. However, the neck portion 42 is centrally disposed relative to the handle portion 44 and the visually exposed surface 46 of the handle portion is concave across the length thereof.

The handle 40 is more suitable for a single lever type faucet assembly or for control of the drain plug where the movement required is other than rotation relative to the neck portion. Although the handle 40 would function as well as the handle 10 the full length contour depicts more of a push-pull or side-to-side movement.

The handles 10 and 40 may be identified, if desired, as by the designators "H" for hot and "C" for cold within the concave thumb receptive portion 24. As previously mentioned, the neck portion 12 underlying this area affords ample material and the recessing of such indicia therein will be of no consequence.

The handle of this invention includes both natural and clean-cut lines which add to its attractiveness. However, the contours provided and the orientation afforded are also functional and contribute appreciably to the acceptability of the product.

I claim:

1. A faucet handle comprising a neck of generally circular cross section and concentric about a vertical axis around which the handle is adapted to be rotated, a handle portion of substantially greater width than thickness and inclined at approximately 45° to said vertical axis and having a central straight longitudinal axis extending generally horizontally and perpendicular to said vertical axis, said handle portion comprising a finger grip portion of oval cross section and adapted to be gripped by the fingers of one hand of the person operating the handle and a thumb receiving portion adapted to receive a thumb of said hand, the lower end of said neck having a recess therein concentric with said vertical axis for receiving a vertical valve stem, the upper end of said neck being integrally secured to said thumb receiving portion, said thumb receiving portion having an upper concave curved surface adapted to comfortably receive and fit said thumb and located between upper and lower surfaces of said finger grip portion, said upper concave curved surface being substantially centered about said vertical axis.

2. A faucet handle comprising a neck of generally circular cross section and concentric about a vertical axis around which the handle is adapted to be rotated, a handle portion of substantially greater width than thickness and inclined at approxmiately 45° to said vertical axis and having a central straight longitudinal axis extending generally horizontally and perpendicular to said vertical axis, said handle portion comprising a finger grip portion of oval cross section adapted to be gripped by the fingers of one hand of the person operating the handle and a thumb receiving portion adapted to receive a thumb of said hand, the lower end of said neck having a recess therein concentric with said vertical axis for receiving a vertical valve stem, the upper end of said neck being integrally secured to said thumb receiving portion, said thumb receiving portion having an upper thumb receiving recess defined in part by a concave part cylindrical thumb receiving surface through which said vertical axis extends and which is curved about an axis which is substantially parallel to but spaced above and laterally of said longitudinal axis, said thumb receving recess also defined in part by a concave end surface which curves upwardly from said part cylindrical surface to the upper surface of said finger grip portion, the sides of said finger grip portion being tangent to the sides of said thumb receiving portion and converging towards one another in a direction away from said thumb receiving portion, and opposite sides of said neck being in alignment with and merging smoothly with the sides of said handle portion.

References Cited in the file of this patent

UNITED STATES PATENTS

| | | |
|---|---|---|
| D. 80,830 | Dobrick | Apr. 1, 1930 |
| D. 81,158 | Schnell | May 13, 1930 |
| D. 82,595 | Ruppel | Nov. 18, 1930 |
| D. 100,685 | Curtiss | Aug. 4, 1936 |
| D. 165,040 | Young | Oct. 30, 1951 |
| D. 191,902 | Bertsch | Dec. 12, 1961 |
| D. 193,827 | Harty | Oct. 9, 1962 |
| D. 193,923 | Harty | Oct. 23, 1962 |
| D. 193,924 | Harty | Oct. 23, 1962 |
| 1,278,552 | Allmand | Sept. 10, 1918 |
| 1,591,433 | Pommer | July 6, 1926 |
| 2,027,053 | Maynes | Jan. 7, 1936 |
| 2,251,168 | Ronnick | July 29, 1941 |
| 3,007,671 | Bartlett | Nov. 7, 1961 |

FOREIGN PATENTS

| | | |
|---|---|---|
| 1,093,785 | France | Nov. 24, 1954 |

OTHER REFERENCES

Neale Ltd., "Design," May 1956, p. 91.

Indiana Brass Co. Ltd., "Domestic Engineering," Aug. 1959, p. 119.

"L'Achitecture D'aumourd Hui," Apr.–May 1960, p. LXXII.

Emminger: Door Handle, "Design," June 1960, p. 60.

Speakman Co., "Domestic Engineering," Sept. 1960, p. 141.

Moen Faucet, "American Builder," Jan. 1961, p. 129.

Moen Faucet, "Domestic Engineering," Sept. 1962, p. 153.